United States Patent
Winkel et al.

(10) Patent No.: US 7,529,940 B1
(45) Date of Patent: May 5, 2009

(54) SECURING SELECTED DATA WITHIN A MESSAGE

(75) Inventors: Jerry Curtis Winkel, Lindon, UT (US); Eugene Kenneth Davis, Lindon, UT (US)

(73) Assignee: Novell, Inc., Provo, UT (US)

( * ) Notice: Subject to any disclaimer, the term of this patent is extended or adjusted under 35 U.S.C. 154(b) by 779 days.

(21) Appl. No.: 10/301,977

(22) Filed: Nov. 22, 2002

(51) Int. Cl.
*H04L 9/00* (2006.01)

(52) U.S. Cl. .................. 713/170; 713/168; 709/206; 709/223; 709/226

(58) Field of Classification Search ............... 713/170, 713/176; 709/206
See application file for complete search history.

(56) References Cited

U.S. PATENT DOCUMENTS

| | | | | |
|---|---|---|---|---|
| 5,155,848 | A | | 10/1992 | Aoshima .................... 395/600 |
| 5,173,854 | A | | 12/1992 | Kaufman et al. ............ 364/419 |
| 5,493,692 | A | | 2/1996 | Theimer et al. ............ 455/26.1 |
| 5,765,178 | A | | 6/1998 | Tanaka ....................... 707/526 |
| 6,108,709 | A | * | 8/2000 | Shinomura et al. .......... 709/239 |
| 6,122,277 | A | * | 9/2000 | Garmire et al. ............. 370/390 |
| 6,192,396 | B1 | * | 2/2001 | Kohler ....................... 709/206 |
| 6,327,612 | B1 | * | 12/2001 | Watanabe .................... 709/206 |
| 6,459,774 | B1 | * | 10/2002 | Ball et al. ................... 379/67.1 |
| 6,748,421 | B1 | * | 6/2004 | Ozkan et al. ................. 709/206 |
| 7,007,067 | B1 | * | 2/2006 | Azvine et al. ............... 709/206 |
| 7,058,054 | B2 | * | 6/2006 | Abdollahi et al. ........... 370/392 |
| 7,079,275 | B2 | * | 7/2006 | Henry et al. ................ 358/1.15 |
| 7,130,885 | B2 | * | 10/2006 | Chandra et al. ............. 709/206 |
| 2001/0037467 | A1 | * | 11/2001 | O'Toole et al. ............. 713/201 |
| 2002/0138582 | A1 | * | 9/2002 | Chandra et al. ............. 709/206 |
| 2002/0198944 | A1 | * | 12/2002 | Moss ......................... 709/206 |
| 2003/0130954 | A1 | * | 7/2003 | Carr et al. .................... 705/60 |

* cited by examiner

*Primary Examiner*—Nasser G Moazzami
*Assistant Examiner*—Fikremariam Yalew
(74) *Attorney, Agent, or Firm*—Schwegman, Lundberg & Woessner, P.A.

(57) ABSTRACT

Methods, systems, and data structures are provided for selectively securing data within a message. A single message includes data. The data can be text data, attachment data, audio data, image data, or video data. Portions of the data are selectively identified with intended recipients. Multiple versions of the message are produced using the selective portions of the data. Each appropriate version of the message is delivered to the intended recipients. In one embodiment, the selective portions of the data are presented as links in the versions of the message, such that when an intended recipient accesses the link, the accessing recipient is first authenticated before being granted access to the selective portions of the data.

12 Claims, 7 Drawing Sheets

SECURING SELECTED DATA WITHIN A MESSAGE

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in any drawings hereto: Copyright© 2002, Novell, Inc., All Rights Reserved.

FIELD OF THE INVENTION

The present invention relates to securing data, and in particular to selectively securing portions of data within a message.

BACKGROUND OF THE INVENTION

Electronic messages are pervasive in today's society. Electronic messages are used to communicate via electronic mail (email) systems, chat room systems, instant messaging (IM) systems, electronic discussion group systems, and the like. Electronic messages have become the preferred method of communication for many. Moreover, the advent of the Internet and the World-Wide Web (WWW) has substantially increased the trend of using electronic messages for communication.

Generally, when a message is constructed it can include a variety of data types, such as text data, image data, audio data, video data, and forwarded emails. The message can also include attachment data, such as when an email includes an attached word processing file, a presentation, an image, and others. When a sender of a message desires to send the message to more than one recipient, then the entire message is sent as a single version of the message to all intended recipients.

However, if the sender desires to add some confidential comments, notes, and/or attachment data for a specifically identified recipient, then the sender is forced to send a separate version of the message to that recipient with the confidential data. Yet, even in these instances, the sender may not be able to prevent the recipient of the confidential data from copying or resending the confidential data to someone else. Thus, the sender may elect not to electronically send the confidential data because it must be separately constructed and sent as a different version of the message, and/or because the confidential data may proliferate within a network having undesired consequences for the sender.

Conventional messaging systems (e.g., email systems, IM systems, chat room systems, message alert systems, and discussion group systems) do not provide the capability to devise and send a single message that has selective security access for each of the intended recipients. Some existing email systems permit a message sender or receiver to make personal notations within a message such that the personal notations are visible only to the creator of the personal notations. For example, some conventional email systems provide a note-taking feature that allows text associated with message data to be displayed only to the creator of the note. But no feature currently exists within email systems that would permit a note taker to send the message only once with the notes being selectively viewable by only selective identified recipients of the message. In fact, the notes are only viewable by the note taker and are usually stored on the note taker's local computing device and not on an email server. Thus, the note taker can only view his/her personal notes when they are using the computing device where the notes were originally made.

As a result, message senders often construct multiple versions of a single email consisting of different data. This can become confusing for the email senders to manage when multiple versions of a single email begin to clutter the inbox or mail folders of the senders. Each version of the email may need to be inspected and viewed by a sender to determine a desired context. Furthermore, in some cases, it may be that the multiple version of the email includes data that is not confidential but, rather, informative to a specific recipient. For example, a sender may desire to send directions to their location to a plurality of recipients. One technique for sending and constructing the email message may be to prefix different portions of the message data with a specific name of the recipient to which that portion of data is directed. However, this unduly clutters the email message and makes it difficult for the recipients to read. The problem can be exacerbated when the message is directed to recipients associated with an organizational project, where the message is directed to all of them, but each having different action items.

As is now apparent to one of ordinary skill in the art, there exists a need for improved techniques that permit a single message to be constructed where access to different portions of the message is selectively restricted based on the identity of the intended recipient. Moreover, there exists a need for techniques to restrict a recipient form reusing portions of a message that is identified as confidential. These needs are particularly desirable in email systems, chat room systems, and discussion group systems.

SUMMARY OF THE INVENTION

In various embodiments of the present invention, techniques for selectively securing portions of a message are presented. The message includes data with selective identifications for portions of the data; each selective portion of the data is associated with one or more intended recipients of the message. One or more versions of the message are produced using the selective identifications, and each version is delivered to the appropriate intended recipient(s).

More specifically and in one embodiment of the present invention, a method to selectively secure data within a message is provided. The message is received from a sender. Moreover, the message includes selective identifications for portions of the data that are associated with selective security for one or more recipients of the message. The data is packaged into one or more versions of the message based on the selective identifications. Further, the one or more versions of the message are forwarded to the one or more appropriate recipients.

In another embodiment of the present invention, another method to selectively secure data within a message is disclosed. The message is generated and directed to one or more recipients. Portions of the data are selectively identified within the message. Each selectively identified portion of the data is also associated with a selective number of the one or more recipients. The message is then forwarded to the one or more recipients.

In still another embodiment of the present invention, a system to selectively secure data within a message is presented. The system includes a message and a message processing application. The message includes data where portions of the data selectively identify one or more recipients that are permissibly allowed to access the portions of the data. Moreover, the message processing application that generates one or more versions of the message based on the portions of the data that selectively identifies the one or more recipients. Next, the message processing application forwards the one or more versions to appropriate recipients.

In yet another embodiment of the present invention, a message data structure for selectively securing portions of data residing in a computer readable medium is described. The message includes data having one or more selective portions of the data identified with security restrictions that limit access to identified recipients. The data is used to generate one or more versions of the message for delivery to the identified recipients.

Still other aspects of the present invention will become apparent to those skilled in the art from the following description of various embodiments. As will be realized the invention is capable of other embodiments, all without departing from the present invention. Accordingly, the drawings and descriptions are illustrative in nature and not intended to be restrictive.

DETAILED DESCRIPTION OF THE INVENTION

Figure 1:
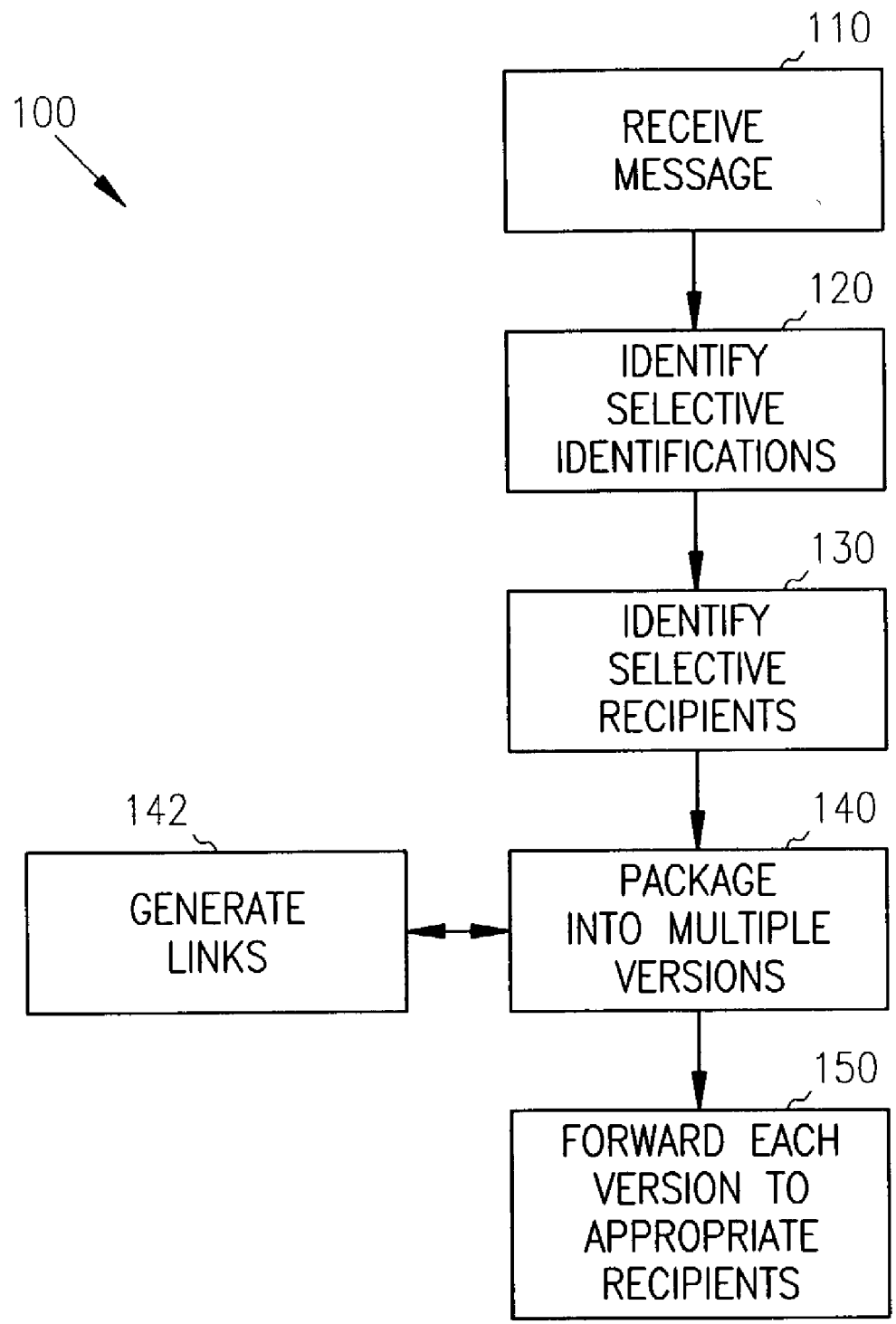
FIG. 1 is flow chart of a method to selectively secure data within a message, according to one embodiment of the present invention.

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

In various embodiments of the present invention, a message is presented. The message resides in a computer readable medium and includes body data and/or attachment data. For purposes of the present invention message data includes both body data and/or attachment data. The data can be of any electronic format, such as text format, image format, video format, audio format, and the like. Moreover, the message can be used within any existing email system, chat room system, message alert system, WWW browser system, or discussion room system, where the system is modified in accordance with various embodiments of the present invention. Additionally, the message can be transmitted via networks (e.g., Local Area Networks (LANs), Wide Area Networks (WANs) (e.g., Internet), and others) to other applications or systems. Furthermore, a message has a sender/creator with one or more recipients/consumers.

The sender modifies the message data in order to selectively identify portions of the data that are to be accessed only by identified recipients. After this modification has occurred, the message can be replicated into one or more versions of the original constructed message. Each version is delivered to an appropriate recipient based on the selectively identified portions of the data.

Any particular version of the message need not include the original selectively identified portions of the data, rather, in some embodiments, a link or an added attachment can be embedded in the particular version of the message, such that an intended recipient must access the link or open the attachment to see the selectively secured data. Moreover, in one embodiment, the selectively secured data can be used with security protocols and/or applications to authenticate the identity of the intended recipient before access to the selectively secured data is granted. The added authentication and security can also be used to restrict the intended recipient's reuse of the selectively secured data.

Of course, the selectively identified portions of the data, in some embodiments, can automatically display within the message to the intended recipients. Thus, the intended recipient need not take any action to see the selectively identified portions of the data. In some cases, this automatic access can also include automatic recipient authentication that is unbeknownst to the intended recipient. In other case, automatic access is provided to the intended recipient with no authentication occurring at all.

Furthermore, in one embodiment, the present disclosure is implemented within the GroupWise email system, distributed by Novell, Inc. of Provo, Utah. In this way, any sender can create a single message within GroupWise and direct selected portions of the message to be selectively delivered to intended recipients. The recipients of the message need not have the same email system. In fact, a recipient can be any recipient with any email system accessible over a network (e.g., Internet). Yet, it is to be understood that the teachings of the present disclosure can be implemented in other existing email systems, message alert systems, WWW browser systems, chat room systems, discussion group systems, custom developed messaging systems, and the like. All such modifications to existing products and/or custom created products, which use the teachings of the present disclosure, are intended to fall within the scope of the present disclosure.

FIG. 1 illustrates a flow chart of one method 100 to selectively secure data within a message, according to one embodiment of the present invention. In one embodiment, the method 100 is implemented within an email, a message alert, a chat room, and/or a discussion group server application. The server application can be replicated and used internally to a specific system processing within a secure network (e.g., LAN) and/or can be used in cross-platform systems processing within non-secure networks (e.g., Internet via gateways and the like).

Accordingly, at 110, a message is received from a sender of the message. The sender can generate the message using a message generating application. For example, in one embodiment, the sender uses an email client application to generate the message; this message is then forwarded or intercepted by an email server application. The email server application can be an internal Post Office Agent (POA) application in cases where the desired recipients of the message are internal users of the email system being used by the sender.

Moreover, the email server application can be a gateway application in instances where the desired recipients of the message are external users of a different email system than that which is used by the sender. Of course as is readily apparent to one of ordinary skill in the art, the sender may be sending the message to a plurality of recipients that include both internal and external recipients to the sender's email system. In these instances, the message can be intercepted and processed by both the local POA application and the gateway application.

In some embodiments, the message sending application includes a Graphical User Interface (GUI) that permits the sender to use an input device (e.g., computer mouse) to highlight selective portions of the message data. Once the selective portions of the message data are highlighted, then the sender can use a pull down menu within the GUI to associated the selected data with a specifically desired recipient. After this has been completed, the sender can view the selective portions of the message data uniquely within the GUI (e.g., a distinguishable color, an icon next to the message data visually identifying that the selected message data is associated with a particular recipient, and the like).

The message receiving application of the sender uses the selectively identified portions of data and indications of intended recipients to save the message with indications of the actions taken by the sender. For example, the message data can include data tags that prefix or surround the selective portions of data. The tags can include identifiers or addresses of the recipients that are intended to be capable of accessing the selective portions of data. In other embodiments, the identifiers or addresses of the intended recipients can be stored as metadata associated with the message data and later associated by the server application. However, any technique that uniquely associates the selectively identified portions of data and the intended recipients can be used with the tenets of the present invention.

Once the message is received, then, at 120, the selective identifications associated with the selective portions of the message data are identified. Next, at 130, the associated intended recipients of the selective portions of the message data are identified. At 140, the selective identifications are used to package the message into one or more variant versions of the original message. Thus, a single message generated by the sender is used to produce multiple versions of the original message.

Each version of the message addresses a selective identification that comports with the original actions of the sender when generating the original message. Each version of the message is also associated with different recipients of the message originally identified by the sender. Further, in some embodiments, the derived versions of the original message need not physically include the actual data associated with the sender's selective identification actions. For example, a derived version of the original message can store the actual data in a remote and/or a secure location, and embed a link in the version of the original message that is delivered to the intended recipient, as depicted at 142.

Thus, when the intended recipient receives the message in order to see the selectively identified data, the intended recipient must traverse or activate the embedded link. In some embodiments, when this occurs the identity of the recipient is authenticated before access to the selectively identified data is granted. Therefore, the intended recipient can be restricted from forwarding the selectively identified data to a non authorized recipient, since when the message is forwarded only the link is included within the version of the original message, and when the link is traversed by a non authorized recipient, the non authorized recipient will not be authenticated and not capable of accessing the selectively identified data. In some embodiments, when the link is traversed a Secure Sockets Layer (SSL) connection is established between the intended recipient's message receiving application and an application having access to the remotely stored selectively identified data. This can be achieved using Hyper Text Transfer Protocol over SSL (HTTPS). HTTPS is available within browser systems, email systems, and the like.

Yet, in some embodiments, the intended recipients need not take any action to access the selectively identified data in the message, since the selectively identified data can be automatically presented for access to the intended recipients. Moreover, recipient authentication can be transparently achieved without any required recipient action. Further, in some instances, no authentication is required at all before the selectively identified data in the message is accessible to the intended recipient.

In some cases the selectively identified data can be in a Hyper Text Markup Language (HTML) format, such that no link needs to be traversed or accessed by the intended recipient, if the intended recipients message receiving application is capable of displaying embedded HTML data types. Moreover, the intended recipient can be automatically authenticated before the intended recipient accesses the HTML data.

In some instances, the selectively identified data does not need to be enforced with security or be remotely stored and accessed by an intended recipient. In these circumstances, the versions of the original message can simple embed the selectively identified data within the message.

Finally, at 150, once the multiple versions of the message are derived from selective identifications made by the sender, the versions are forwarded to the intended recipients. The intended recipient can then access the selectively identified data by one of the several techniques discussed above.

When a sender selectively identifies portions of the message data, the selective identification can be made on portions of message body data and/or on message attachment data represented as attached files. Moreover, the message body data can include embedded files such as image files, audio files, word processing files, video files, and the like.

Although various embodiments of FIG. 1 have been discussed such that selective portions of the message data is selectively included and excluded based on actions of the sender, this need not be the case in all circumstances. For instance, in some embodiments, a sender can selectively identify portions of the data and then associated recipients that are not permitted to access the selectively identified portions of data. In this way, the sender can selectively include or exclude recipients from selectively identified data.

Moreover, various embodiments of FIG. 1 were discussed within the context of an email system; this was done for purposes of illustration only. In fact, a variety of message-enabled systems can be used with the tenets of the present invention. For example, in some embodiments, a Simple Network Management Protocol (SNMP) messaging system can be used to selectively send portions of alarms or alerts to network administrators across a network. This can be particularly advantageous, since often SNMP alarms can contain privileged information such as Internet Protocol (IP) addresses, server names, domain names, network resource names, and the like. Yet, at the same time, it is common for a plurality of disparate recipients to be included on an SNMP alarm list.

Thus, if an organization out-sources portions of its network management to a third-party service provider, then the organization may not desire to have some information typically included within a SNMP alarm message be received by the third-party service provider. A common example is where the third-party service provider is handling a network help desk function for the organization. The help desk performs an initial investigation of the SNMP alarm, and if the alarm is deemed critical, then the problem is forwarded to engineering staff that may be within the organization or another third-party service provider separate from the help desk. The engineering staff will need specifics of the SNMP alarm but the helpdesk does not need to know the specifics. Moreover, the help desk may not have the security access to fix the problem nor is it desirable for the help desk to see certain confidential aspects of the SNMP alarm message.

The present disclosure can be used to solve this problem, by modifying the SNMP alarms that are broadcast on a network to various recipients, such that confidential aspects of the SNMP alarm messages are only accessible to authorized recipients. Moreover, for purposes of the present disclosure, a recipient need not be an end user. The recipient can be any identifiable network resource, such as specific computing device, a network management console display application, or another application. Thus, a single SNMP alarm can be deployed by a broadcast throughout a network, where only authorized recipients (e.g., displaying applications, resources, end-users, and the like) are capable of accessing or viewing selectively identified confidential information.

In a similar manner, the present disclosure can be used to enhance other messaging systems, chat room systems, discussion group systems, and the like. All such systems that permit a single message to be constructed and directed to a plurality of recipients where each recipient or sub-set of recipients has access to only selective portions of the original message is intended to fall within the broad scope of the present invention.

Figure 2:
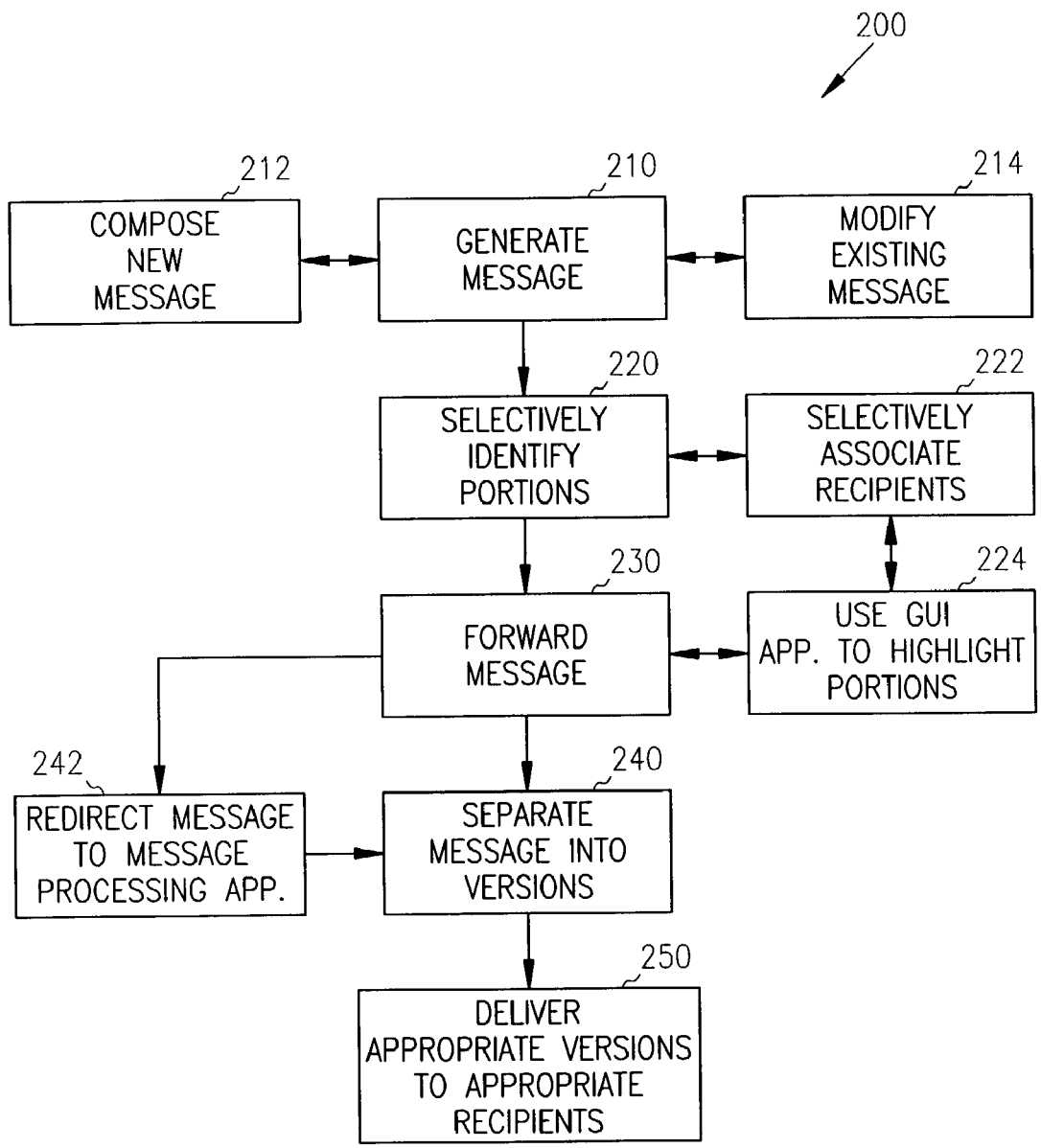
FIG. 2 is flow chart of another method to selectively secure data within a message, according to one embodiment of the present invention.

FIG. 2 illustrates flow chart of another method 200 to selectively secure data within a message, according to one embodiment of the present invention. In one embodiment, the method 200 is implemented within a message generating application, such as an email client, a SNMP alarm client, a chat room client, a discussion group client, and other messaging clients. The message generating application interfaces with a sender and/or creator of a message. Moreover, the message generating application need not generate only newly constructed message, rather, existing messages can be replied to or forwarded and modified according to the teachings of the present disclosure. Further, as is readily apparent to one of ordinary skill in the art, a sender can be a recipient depending upon the action being taken by the recipient. For example, if a recipient is forwarding or replying to a message, then the recipient in this context is a sender.

The message generating application can use GUI interfaces, text user interfaces (TUI), and/or Disk Operating System (DOS) user interfaces (DUI) to interact with a sender/creator. Accordingly, at 210, a sender/creator generates a message. In one circumstance, at 212, the sender generates a new message. In other instances the sender generates the message by modifying an existing message, as depicted at 214.

At 220, the sender/creator interacts with interfaces of the message generator application in order to selectively identify portions of the message data that the sender/creator desires secure or restrict. In doing this, the sender/creator also selectively identifies intended recipients of the identified portions of the data, as depicted at 222. In one embodiment, at 224, the selectively identified portions of data and the intended recipients are identified through GUI interface applications of the message generating application. For example, selected portions of the data can be highlighted or selected within the message and then associated with intended recipients via a pull down menu option (e.g., right computer mouse click over the highlighted or selected data). When the sender/creator interacts with the message generating application in this manner, the message generating application is capable of uniquely isolating the selected data and associating unique attributes to the selected data. The unique attributes are either embedded in the message data or linked to metadata that is associated with the message data.

In some embodiments, the message generating application is capable of tracking the attributes with the message for purposes of providing filtering or other tracking features to the sender/creator. In this way, a sender can filter and identify previous messages where a particular recipient was identified with selective portions of the data. Of course other features are capable by tracking the message attributes and all such features are intended to fall within the scope of the present disclosure.

Once the sender/creator has finished generating and modifying the message, then, at 230, the message is forwarded or sent to multiple recipients of the message. In one embodiment, the message being forwarded is redirected from the message generating application to a message processing application (e.g., email server, gateway server, chat room server, discussion group server, and the like). The message processing application parses the message to produce or derive one or more versions of the message. Each version conforms to the actions taken by the sender/creator, such that some versions include portions of message data that other versions do not have and vice versa.

Thus, at 240, a message processing application or the message generating application, in other embodiments, will separate the message into multiple versions of the original message generated by the sender/creator. Each of these versions is then delivered to the intended recipients at 250.

Moreover, the versions that include portions of the message data that are being secured to specific intended recipients can include the portions of the message data, include links to reference the portions of the message data, or include attachment data with the message that includes the portions of the message data. If a link is used, then the link can establish a secure connection with a remote server application that houses the portions of the message data. In this way, the intended recipient's identity can be authenticated before access to the message data is granted.

Figure 3:
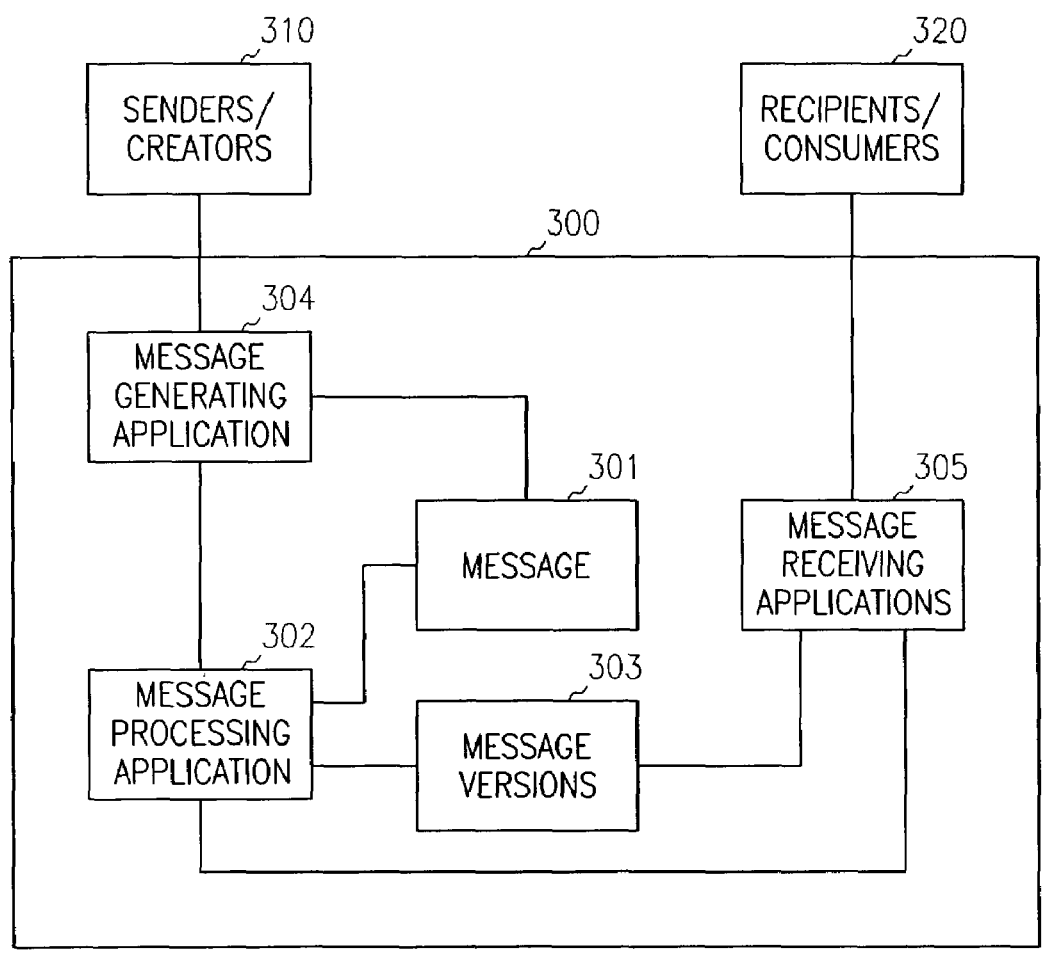
FIG. 3 is a diagram of a system to selectively secure data within a message, according to one embodiment of the present invention.

FIG. 3 illustrates diagram of one system 300 to selectively secure data within a message, according to one embodiment of the present invention. The system 300 includes a message 301, and a message processing application 302. The system 300 also includes one or more versions of the message 303, a message generating application 304, and one or more message receiving applications 305. The system 300 interacts within a communications network and is accessed by senders/creators 310 of the message 301 and recipients/consumers 320 of the versions of the message 303. Each of the components of the system is either data accessible on a computer readable medium and/or software instructions that are executable on computer or processing devices.

The sender/creator uses the message generating application 304 to initially compose a new message 301 or modify and existing message 301. Within the message 301 are selective identifications of message data that are associated with selective intended recipients/consumers 320. These associations permit the intended recipients/consumers 320 to gain access to selected portions of the message data. The message generating application 304 can make any uniquely identifiable association within the message 301 to effect the actions taken by the sender/creator 310 on the message 301.

In one embodiment, once the message 301 is generated, the message generating application 304 forwards the message 301 to the message processing application 302. The message processing application 302 generates or derives the one or more versions of the message 303 using the uniquely identifiable associations included within the message 301. Accordingly, multiple versions of the message 303 are produced and forwarded or delivered to the appropriate intended recipients/consumers 320.

The message receiving applications 305 intercept the versions of the message 303 and present them to the appropriate intended recipients/consumers 320 for consumption. The versions of the message 303 include selective portions of the original message data or exclude selective portions of the original message data. The versions can include embedded portions of the original message data or alternatively can include links or attachments to the portions of the original message data. In this way, portions of the original message data can be stored separately from the versions and remote from the message receiving applications 305. This could be beneficial for purposes of security such that the intended recipients/consumers 320 are authenticated before access to the portions of the original message data is restricted and the intended recipients/consumers 320 are limited in further actions that may be taken on the portions of the original message data.

As one of ordinary skill in the art now appreciates, a single message 301 can be generated and sent to a plurality of recipients/consumers 320 where each recipient/consumer 320 can selectively access only portions of the message data that were identified by the original sender/creator 310 of the single message 301. This is achieved by using selective identifications within the message 301 that can then be used by a message processing application 302 to produce and send one or more versions of the message 303 to the appropriate intended recipients/consumers 320.

Figure 4:
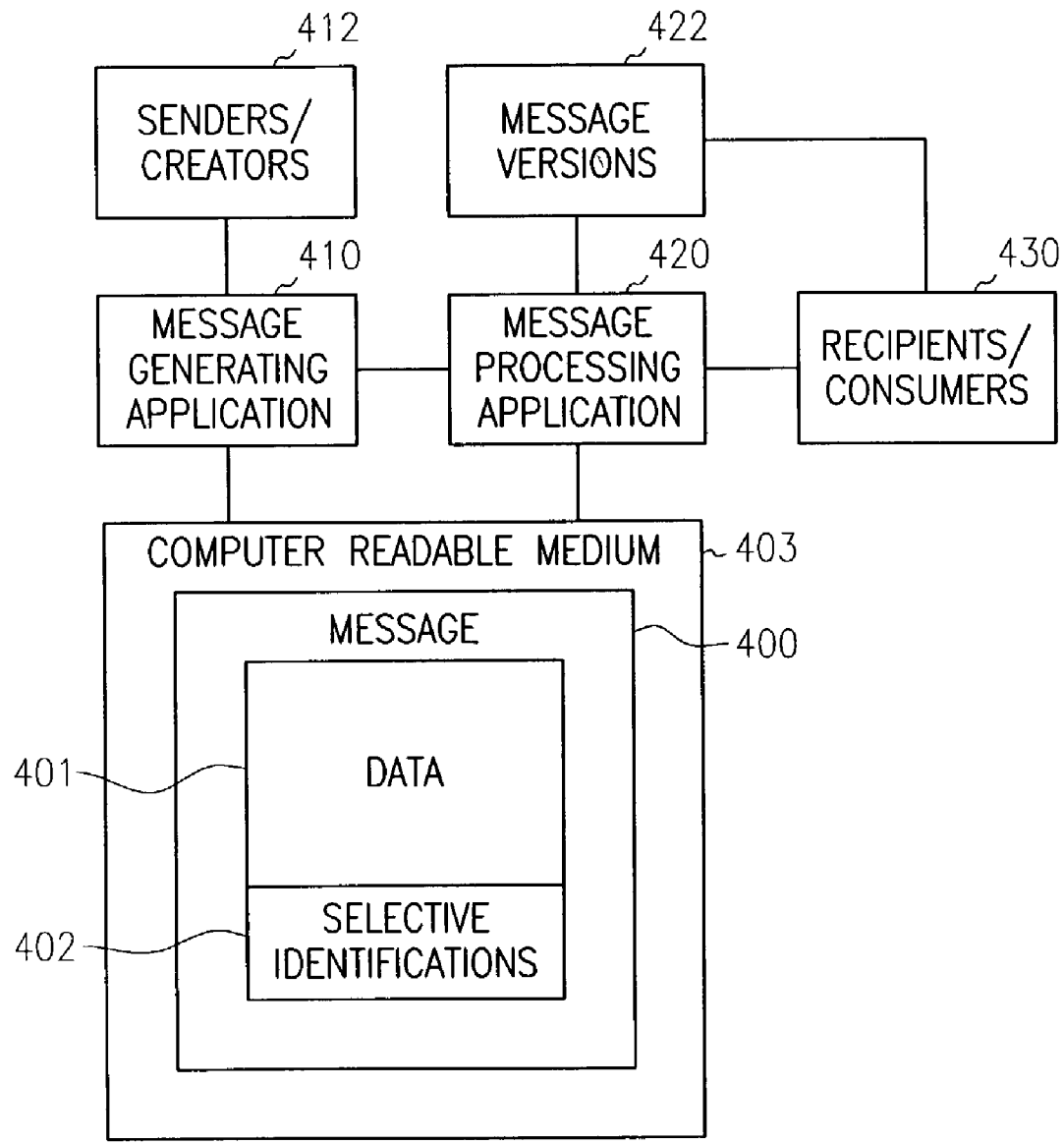
FIG. 4 is a diagram of a message data structure used for selectively securing data, according to one embodiment of the present invention.

FIG. 4 illustrates a diagram of one message data structure 400 used for selectively securing data, according to one embodiment of the present invention. The message data structure 400 includes message data 401 having selective identifications 402 that identify portions of the message data 401 for purposes of selective access. The message data structure 400 resides in a computer readable medium 403. Furthermore, the message data structure 400 can be transmitted over a communications network and consumed or modified by one or more software applications.

The message data structure 400 is originally generated by a message generating application 410 (e.g., an email client, a SNMP alarm client, a network management console client, a chat room client, a discussion group client, a browser client, and the like). The message data structure 400 can be generated as a new message or generated by modifying an existing message. The message generating application 410 communicates via interfaces (e.g., GUI, TUI, and DUI) to interact with senders/creators 412.

The senders/creators 412 select (e.g., highlight or otherwise identify) portions of data 401 included within the message data structure 400. In doing this, the senders/creators 412 also associated a number of intended recipients 430 with the selected portions of data 401. The senders/creators 412 then instruct the message generating application 410 to send the single message data structure 400. The message generating application sends the message data structure 400, which is intercepted or redirected to a message processing application 420.

The message processing application 420 inspects the message data structure 400 and identifies the selective identifications 402. The data 401 is then parsed into multiple versions 422 of the original message data structure 400. Next, the message processing application 420 forwards, sends, or delivers the appropriate versions 422 to the appropriate intended recipients/consumers 430. The versions 422 need not physically or contiguously include the appropriate data 401, rather, in some instances the appropriate data 401 is stored remote from the versions 422 and is accessible via a link included within the versions 422. In some instances, when the intended recipients/consumers 430 are authenticated when they access the links before any access to the appropriate data 401 is granted. This can also restrict the recipients/consumers 430 from redistributing the appropriate data 401 to other unauthorized recipients/consumers 430.

Moreover, in some embodiments, the senders/creators 412 use interfaces of the message generating application 410 to visually discern the selective identifications 402 of the message data structure 400. Visual cues can include different font types, different highlighting colors, icon images placed adjacent to the selective identifications 402, and the like. Thus, the senders/creators 412 can readily discern what portions of the data 401 are being secured and directed to what intended recipients/consumers 430.

Figure 5:
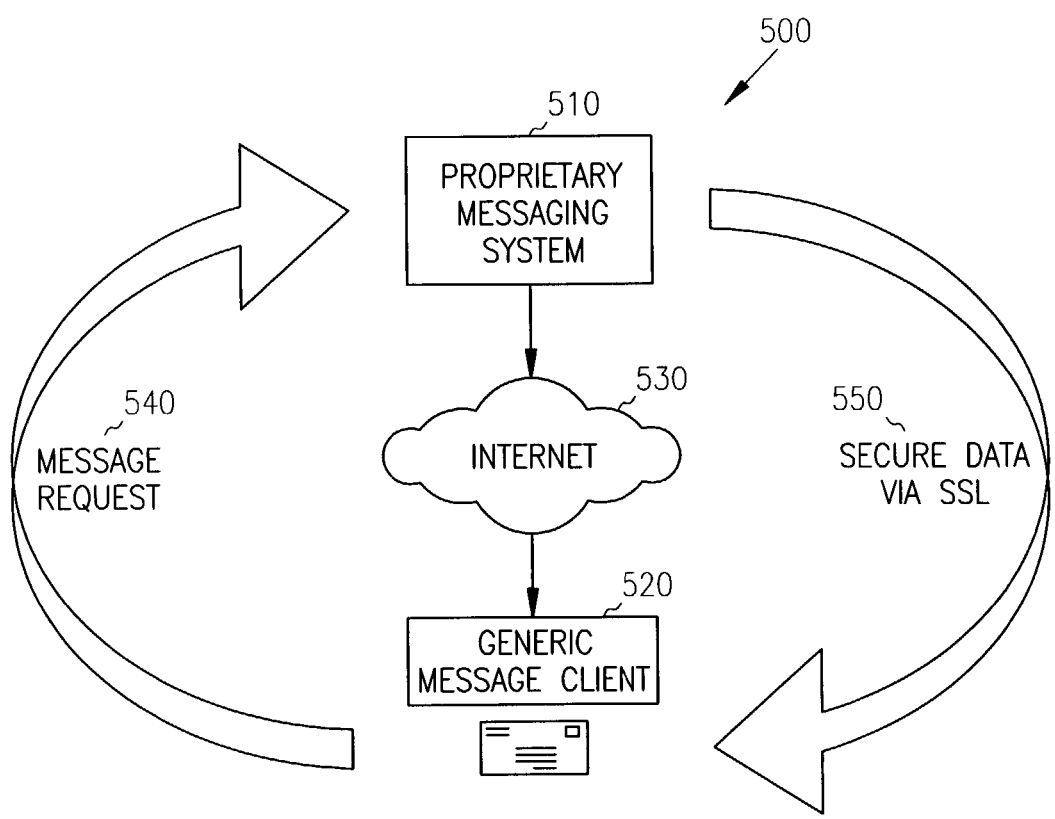
FIG. 5 is a diagram that depicts one example technique for selectively providing access to secured data within a message, according to one embodiment of the present invention.

FIG. 5 illustrates a diagram that depicts one example technique for selectively providing access to secured data within a message, according to one embodiment of the present invention. A proprietary messaging system 510 (e.g., modified email system, chat room system, discussion group system, and others) produces a single message having selective identifications for portions of the message data associated with specific intended recipients. The messaging system 510 then produces multiple versions of the message based on the selective identifications and sends at least one of the versions to an intended recipient that is external to the messaging system 510. This transfer occurs over the Internet and is received by a generic message client 520.

The version of the original message includes a link to the selectively identified data that was included in the original message. When the recipient activates the embedded link, the generic message client 520 effectively sends a message request 540 back to the messaging system 510. The messaging system then authenticates the identity of the recipient, and if authenticated delivers the selectively identified data to the generic message client 520 via a SSL connection 550. Thus, the recipient can consume the selectively identified data in a secure manner from a generic message client 520, and this secure delivery can prevent the recipient from forwarding the selectively identified data to a different recipient, if this is desired in the configuration of the technique presented in FIG. 5.

FIG. 5 is presented for purposes of illustration only, and to highlight only one aspect of the present disclosure. It is therefore not intended to limit the various embodiments of the present invention that were presented above.

Figure 6A:
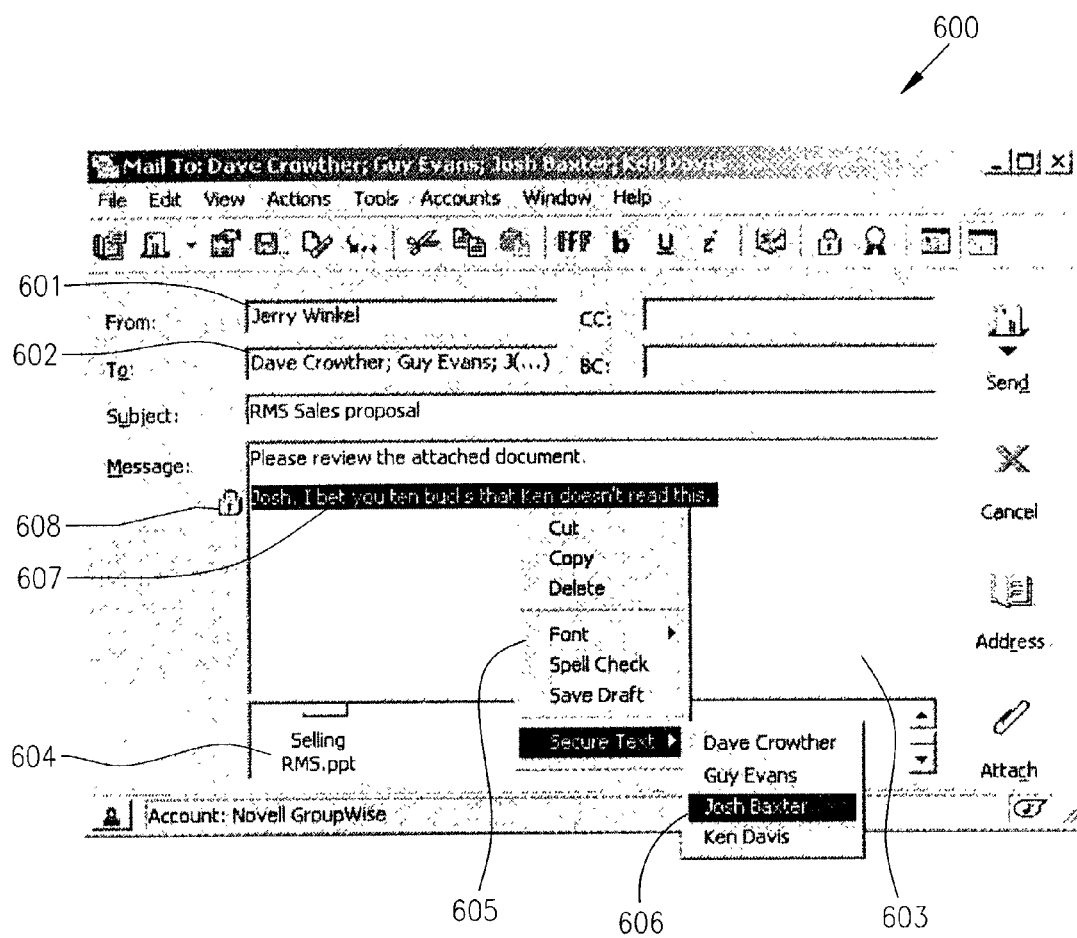
FIG. 6A is a diagram of an example interface for generating a message with selectively secured data within the message, according to one embodiment of the present invention.

FIG. 6A illustrates a diagram of an example interface 600 for generating a message with selectively secured data within the message, according to one embodiment of the present invention. The example interface of FIG. 6A depicts an email client for the GroupWise email system, distributed by Novell Inc. of Provo, Utah. FIG. 6A is presented for purposes of illustration only and is not intended to limit the present invention, since any email system, chat room system, discussion group system, and the like can benefit from the teachings presented herein.

The interface 600 is depicted as a GUI window with various labels and input fields for receiving data. The interface 600 is used to construct a message according to one embodiment of the present disclosure. The message includes a sender/creator 601 and a plurality of recipients 602. The message also includes message body data 603 and message attachment data 604. Moreover, the interface 600 permits data that is selected 607 to be selectively associated with a specific intended recipient 606, through the use of pull down interface menus 605.

Once the selected data 607 is associated with a specific intended recipient 606, then the interface 600 identifies the selected data 607 with a lock icon image 608. This lock icon image 608 permits the sender 601 to readily identify the selected data 607. When the sender 601 sends the message, the selective data 607 and the specific intended recipient 606 is readily identifiable within the message to a GroupWise Post Office Agent (POA) or a GroupWise Internet Agent (GWIA). The processing application (POA or GWIA) will then uses the selective data 607 and the specified intended recipient 606 to generate a version of the message that includes the selected data 607 for the intended recipient 606. Other versions of the message directed to the remaining recipients 602 will not include the selected data 607. Thus, a single message is constructed within an interface 600 and used to deliver different versions of the message to a plurality of different recipients.

Figure 6B:
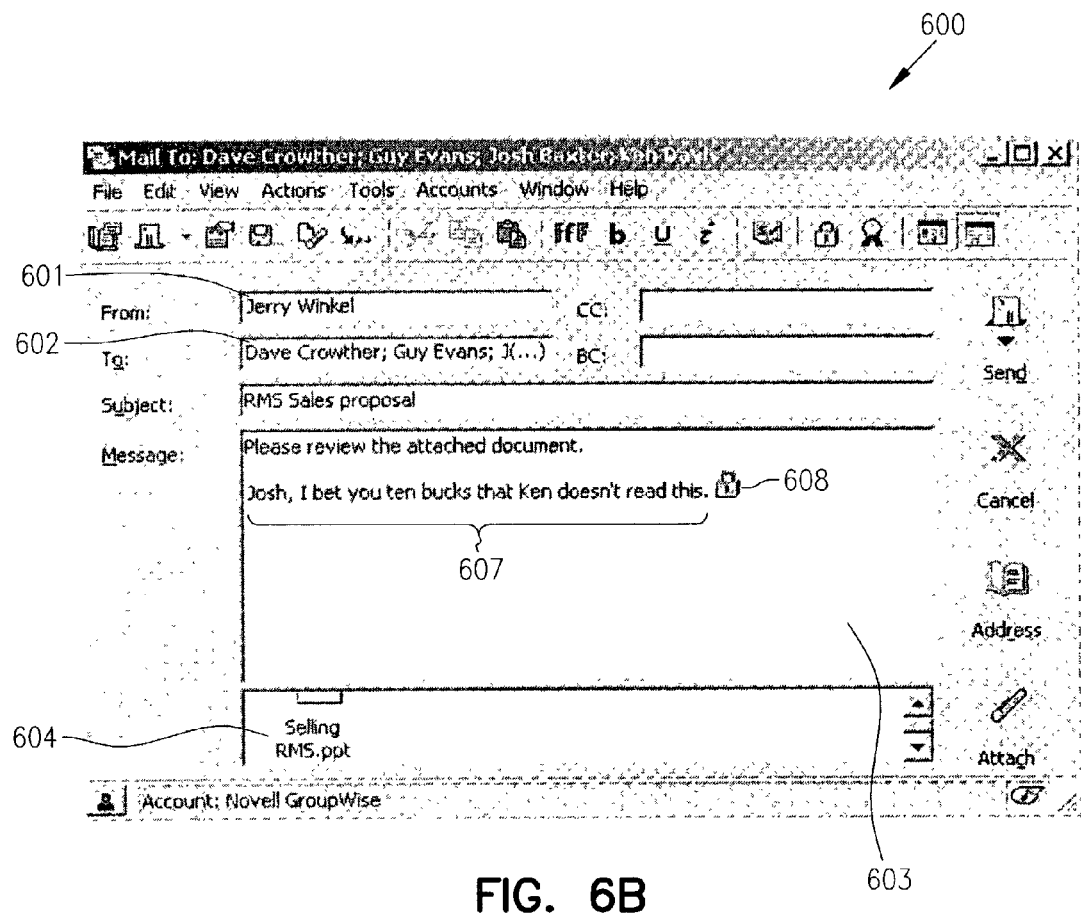
FIG. 6B is a diagram of FIG. 6A after a message is generated with selectively secured data within the message, according to one embodiment of the present invention.

FIG. 6B illustrates a diagram of FIG. 6A after a message is generated with selectively secured data within the message, according to one embodiment of the present invention. In FIG. 6B the selected data 607 includes the lock image icon 603 that has been conveniently repositioned within the message body data 603 for better comprehension of the sender 601. Again, FIG. 6B is presented for purposes of illustration only, and is not intended to limit the present disclosure. It is readily apparent to one of ordinary skill in the art that a multitude of visual cues (e.g., fonts, colors, data effects, and the like) can be used to provide improved comprehension of the sender 601, so that the sender 601 can readily recognizes and associate the selected data 607. All such presentation techniques are intended to fall within the broad scope of the present disclosure.

The foregoing description of various embodiments of the invention has been presented for purposes of illustration and description. It is not intended to be exhaustive nor to limit the invention to the precise form disclosed. Many alternatives, modifications, and variations will be apparent to those skilled in the art in light of the above teaching. For example, although various embodiments of the invention have been described as a series of sequential steps, the invention is not limited to performing any particular steps in any particular order. Accordingly, this invention is intended to embrace all alternatives, modifications, equivalents, and variations that fall within the spirit and broad scope of the attached claims.

What is claimed is:

1. A method implemented in a computer-readable storage medium and to process on a computer to selectively secure data within a message, comprising:
   receiving the message from a sender where the message includes selective identifications for portions of the data that are associated with selective security for one or more recipients of the message;
   packaging the data into one or more versions of the message based on the selective identifications, and wherein at least one of the versions is packaged as a link that a particular recipient receives, and wherein the particular recipient has to activate the link to remotely acquire a corresponding portion of the data that the link replaced within that version of the message designated for the particular recipient, and an identity for that particular recipient is authenticated unbeknownst to the particular recipient before the corresponding portion of the data is acquired, and wherein reuse of the corresponding portion is restricted in response to the authentication and the corresponding portion is available to the particular recipient via a Secure Sockets Layer (SSL) connection established between the recipient's message receiving application and a remote server application, and wherein the remote server application has the corresponding portion of the data that the link replaced and the corresponding portion of the data replaces the link in the particular recipient's version of the message when the link is activated by the recipient and when the identity of the recipient has been authenticated; and
   forwarding the one or more versions of the message to one or more of the recipients.

2. The method of claim 1 wherein in receiving the message, the message is an email message and is received by a processing post office application.

3. The method of claim 2 wherein in receiving the message, the post office application is an application processing on a gateway.

4. The method of claim 1 wherein in receiving the message, the selective identifications are data tags that identify portions of the data, and wherein the tags also identify one or more of the recipients.

5. The method of claim 1 wherein in receiving the message, the data includes at least one of text data, attachment data, image data, audio data, and video data.

6. The method of claim 1 wherein in packaging the data, the one or more versions of the message selectively include or exclude portions of the data in a number of the versions of the message based on the selective identifications and the one or more recipients.

7. The method of claim 1 wherein in packaging the data, a number of the versions of the message are generated by including links to portions of the data having selective identifications, and the links can be activated by a number of the recipients.

8. A system to selectively secure data within a message, the system implemented in a computer-readable storage medium and processed on one or more computers of a network, comprising:
   a message including data, wherein portions of the data selectively identify one or more recipients that are permissibly allowed to access the portions of the data; and
   a message processing application that generates one or more versions of the message based on the portions of the data that selectively identify the one or more recipients, and wherein the message processing application forwards the one or more versions to appropriate recipients, and wherein at least one version of the message is replaced by a link that a particular recipient activates in order to acquire a corresponding portion of data that the link replaced and when the particular recipient activates the link an identity for that particular recipient is authenticated unbeknownst to the particular recipient and before the corresponding portion of data that the link replaced is presented to the particular recipient, and wherein reuse of the corresponding portion is restricted in response to the authentication and the corresponding portion is available to the particular recipient via a Secure Sockets Layer (SSL) connection established between the recipient's message receiving application and a remote server application, and wherein the remote server application has the corresponding portion of the data that the link replaced and the corresponding portion of the data replaces the link in the particular recipient's version of the message when the link is activated by the recipient and when the identity of the recipient has been authenticated.

9. The system of claim 8 further comprising:

a message generating application that generates the data and the portions of the data that selectively identify one or more of the recipients, and wherein the message generating application forwards the message to the message processing application; and a message receiving application that is used by the one or more recipients to consume one or more of the versions of the message forwarded by the message generating application.

10. The system of claim 9 wherein the message generating application and the message processing application are part of a single integrated email system, an alarm system, chat room system, or discussion group system.

11. The system of claim 8 wherein the one or more versions of the message selectively include or exclude the portions of the data that selectively identify one or more of the recipients.

12. The system of claim 8 wherein the one or more versions of the message selectively include links to the portions of the data that selectively identify one or more of the recipients.

\* \* \* \* \*